M. BLUM.
VALVE.
APPLICATION FILED DEC. 15, 1920.

1,398,764.

Patented Nov. 29, 1921.

WITNESSES
Edw. Thorpe
F. J. Foster

INVENTOR
Morris Blum
BY Munn & Co
ATTORNEYS

UNITED STATES PATENT OFFICE.

MORRIS BLUM, OF LOS ANGELES, CALIFORNIA.

VALVE.

1,398,764.  Specification of Letters Patent.  Patented Nov. 29, 1921.

Application filed December 15, 1920. Serial No. 430,846.

*To all whom it may concern:*

Be it known that I, MORRIS BLUM, a citizen of the United States, and a resident of Los Angeles, in the county of Los Angeles and State of California, have invented a new and Improved Valve, of which the following is a full, clear and exact description.

This invention relates to improvements in valves, particularly air outlet vales for steam radiators, an object of the invention being to provide a valve of this character which will allow the escape of air from a radiator, but which will automatically close when steam starts to escape therefrom.

A further object is to provide a valve in which the moisture and heat of the steam act upon an expanding member to close the outlet passage after the air has escaped.

A further object is to provide an air outlet valve for steam radiators which will be simple and practical in construction, efficient and durable in use, and comparatively inexpensive to manufacture.

With these and other objects in view the invention consists in certain novel features of construction and combinations and arrangements of parts, as will be more fully hereinafter described and pointed out in the claims.

In the accompanying drawings—

Figure 1:
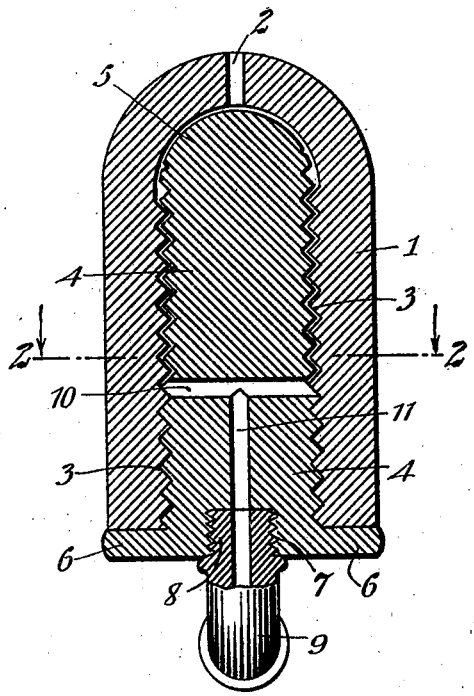
Figure 1 is a view in longitudinal section through my improved valve.
Figure 2:
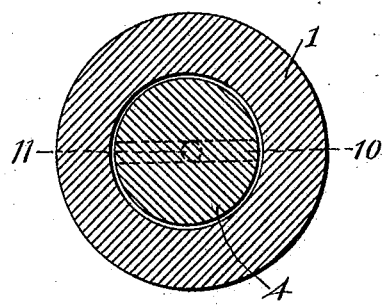
Fig. 2 is a view in transverse section on the line 2—2 of Fig. 1.

Referring in detail to the drawings, 1 represents the casing of my improved valve. The casing is of general cylindrical shape and is formed with one open end. The other end of the casing is rounded and provided with a centrally disposed opening or perforation 2. The interior of the casing is threaded as shown at 3.

The core 4 of the valve is cylindrical and slightly tapering in shape and is formed with external screw threads engaging loosely with the threads of the casing. The core includes a rounded upper end 5 which conforms to the shape of the rounded end of the casing, but is spaced slightly therefrom. An external annular flange 6 around the base of the core forms a shoulder against which the lower end of the casing abuts. The tapering formation of the core results in a tight fit of the core and casing adjacent the base flange and a relatively loose fit at the upper end of the casing adjacent the rounded end. The lower end of the casing is provided with a threaded recess 7 which receives a threaded nipple 8 on the steam outlet pipe 9 of a radiator not shown.

A transversely disposed passage 10 in the intermediate portion of the core communicates at its center with a short vertical passage 11 registering with the pipe 9.

It will thus be seen that air escaping from the pipe 9 must necessarily flow through the T-shaped passage formed by the two passages 10 and 11 and then pursue a circuitous or tortuous course between the threads of the casing and the threads of the core until it escapes from the opening 2.

My improved valve may be made entirely of wood if desired. If the device is made of wood the core is preferably formed of a highly absorbent and porous wood which will expand quickly when subjected to moisture so that when the air has passed from the radiator and the steam starts to follow through the core will expand and tightly engage the casing cutting off the escape of steam almost immediately. The spacing between the core and the casing is greatly exaggerated in the drawing to more clearly bring out the idea.

I might also form the valve entirely of metal. In this instance the casing would be formed of steel or some other metal which does not expand greatly when heated and the core would be of aluminum or some similar metal with a high co-efficient of expansion. In this instance the heat of the steam will expand the metal core in the same way that the moisture expands the wooden one, quickly and effectively cutting off the escape of steam.

I do not wish to be limited to the use of any particular materials, but rather desire to cover broadly the idea of the expanding core which will automatically close the outlet passage against the escape of steam.

It is apparent, therefore, that various slight changes might be made in the general form and arrangement of the parts described without departing from the invention, and hence I do not limit myself to the precise details set forth but consider myself at liberty to make such changes and alterations as fairly fall within the spirit and scope of the appended claims.

I claim:

1. A valve comprising an internally screw threaded cylindrical casing having an opening therein, a screw threaded core loosely fitting the casing, said core having a T-shaped passage therein communicating with the outlet pipe of a radiator, said core being formed of material adapted to expand more quickly than the casing when subjected to moisture.

2. A valve comprising an internally screw threaded cylindrical wooden casing having an opening therein, a tapering externally screw threaded wooden core loosely fitting the casing, said core having a T-shaped passage therein communicating with the outlet pipe of a radiator, said core being formed of a highly absorbent wood adapted to expand more quickly than the casing when subjected to moisture.

3. A valve comprising an internally screw threaded casing of cylindrical shape including an open end and a rounded end having an opening therein, an externally screw threaded tapered expansible core loosely fitting the casing, a flange on the core abutting against the open end of the casing, said core having a screw threaded recess therein adapted to receive the threaded nipple of an outlet pipe from a steam radiator, said core having a transverse passage in its intermediate portion, and having a vertical passage registering with the pipe and communicating with the transverse passage

MORRIS BLUM.